(12) United States Patent
Möller et al.

(10) Patent No.: US 6,186,180 B1
(45) Date of Patent: Feb. 13, 2001

(54) PLUG-IN CONNECTOR

(75) Inventors: Rudolf Möller; Mario Hufnagel, both of Attendorn (DE)

(73) Assignee: Muhr und Bender, Attendorn (DE)

( * ) Notice: Under 35 U.S.C. 154(b), the term of this patent shall be extended for 0 days.

(21) Appl. No.: 09/315,158

(22) Filed: May 20, 1999

(30) Foreign Application Priority Data

May 26, 1998 (DE) ............................................. 198 39 726
Jun. 24, 1998 (DE) ............................................. 198 27 763

(51) Int. Cl.$^7$ ................................................... F16L 55/10
(52) U.S. Cl. ........................... 138/89; 138/120; 138/155; 285/351; 285/305
(58) Field of Search ............................. 138/89, 109, 120, 138/155; 285/305, 321, 924, 237, 921

(56) References Cited

U.S. PATENT DOCUMENTS

| 3,574,362 | | 4/1971 | Gregg et al. | 285/321 |
| 3,584,902 | * | 6/1971 | Vyse | 285/305 |
| 3,922,011 | * | 11/1975 | Walters | 285/277 |
| 4,884,829 | * | 12/1989 | Funk et al. | 285/24 |
| 5,882,044 | * | 3/1999 | Sloane | 285/92 |
| 5,979,946 | * | 11/1999 | Peterson et al. | 285/305 |

FOREIGN PATENT DOCUMENTS 387 688   2/1924 (DE) .

* cited by examiner

*Primary Examiner*—Patrick Brinson
(74) *Attorney, Agent, or Firm*—Nixon Peabody LLP; David S. Safran

(57) ABSTRACT

A plug-in connector, especially for hose connections and for use in motor vehicles, including a receptacle and a plug. The receptacle may be provided with an insertion opening for receiving the plug and a groove for retaining at least one locking spring which may be used to lock the receptacle and plug together. The locking spring may include at least one locking section and one unlocking section which can be actuated from the outside of the receptacle. The receptacle may also include an unlocking opening accessible from outside of the receptacle and which discharges into the groove so that the unlocking section of the unlocking spring may extends from the groove into the unlocking opening. The locking spring is retained in the groove in a manner that the locking section is moved outward in a substantially radial direction into the groove when a force is applied to the unlocking section, thus disengaging the locking section from the plug and allowing separation of the plug and the receptacle. The improved plug-in connector avoids the possibility of unintentional unlocking of the receptacle and plug present in the prior art plug-in connectors. In addition, in a plug-in connector in accordance with the present invention prevents the loss of the locking spring.

17 Claims, 4 Drawing Sheets

PLUG-IN CONNECTOR

BACKGROUND OF THE INVENTION

1. Field of the Invention

The invention relates to a plug-in connector including a receptacle and a plug, especially for hose connections for use in motor vehicles. In particular, the present invention relates to such a plug-in connector where the receptacle is provided with an insertion opening for the plug and at least one locking spring which is used to lock the receptacle and plug. The present invention also relates to such a plug-in connector where the locking spring is provided with at least one locking section and one unlocking section which can be actuated from the outside of the receptacle.

2. Description of the Related Art

The plug-in connector in accordance with the present invention may be generally used for hose connections, i.e. for connecting the ends of two hoses. But the utility of the plug-in connector in accordance with the present invention is not limited to such an application. On the one hand, the plug-in connector in accordance with the present invention can also be used for pipe connections such as in the case when relatively flexible pipes are to be connected. On the other hand, the present invention may be practiced in other applications where either the receptacle or the plug is made stationary or provided on a stationary fixture and the complementary component (either a plug or a receptacle) is provided on an end of a hose or a pipe such that the hose or the pipe may be connected with the stationary receptacle or plug. In this regard, although the plug-in connector in accordance with the present invention is described in detail in the context of plug-in connector for hose connection applications, it should be understood that the present invention is not limited thereto.

A plug-in connector of the initially described type is generally known and practiced in the art. In these known plug-in connectors, a spring wire which is bent in roughly a U-shape is seated from the outside on the receptacle or is inserted into the receptacle for locking and unlocking purposes. In the area of the insertion opening, the receptacle is provided with through slots on opposite sides. Inserted into these slots, the arms of the U-shaped spring wire partially project into the insertion opening of the receptacle, specifically with one locking section at a time. The plug, on its front end is provided with a contact bevel which, when the plug is inserted into the insertion opening of the receptacle, presses the two arms of the U-shaped spring wire to the outside. As the plug continues to be inserted into the insertion opening of the receptacle, the locking sections of the two arms of the U-shaped spring wire fit behind a corresponding stop on the plug. Thus, in this manner, the U-shaped spring wire acts as a locking spring. The U-shaped spring wire described above, is bent in the manner of a loop to the outside on its U-bridge so that in this way, an actuation opening is formed between the receptacle and the U-bridge which has been made looped. On the outside of the receptacle, guide surfaces which are limited by one stop each, are assigned to the ends of the two arms of the U-shaped spring wire. For unlocking purposes, an unlocking tool, for example, a screwdriver, is inserted into the above described actuation opening and the U-shaped spring wire is pressed or pulled radially to the outside. In so doing, the locking sections of the legs of the U-shaped spring wire move to the outside so that these locking sections disengage from the stop provided on the plug. The stops which border the guide surfaces on the receptacle are designed to prevent the locking spring (i.e. the U-shaped spring wire) from being completely withdrawn from the receptacle during unlocking.

In the above described known plug-in connector, one disadvantage is that during unlocking, it can happen that the locking spring can be unintentionally withdrawn from the receptacle and lost, in spite of the stops which border the guide surfaces on the receptacle. When this occurs, a new locking spring must be procured first in order to again, lock the receptacle and plug. In addition, another disadvantage of the known plug-in connector is that the locking spring can be bent. When this occurs, it must then be moved again into its original position for locking by hand. Yet another disadvantage is that one can easily unintentionally unlock the prior art plug-in connector by hand. Such unintentional unlocking can be very dangerous and poses a very significant safety concern. For example, such unintentional unlocking can lead to scalding and severe burns on an unsuspecting person if the plug-in connector is being used to carry a hot medium.

SUMMARY OF THE INVENTION

The primary object of the present invention is to provide an improved plug-in connector which will prevent the loss of a locking spring.

The second object of the present invention is to provide an improved plug-in connector which will prevent the bending of the locking spring.

Yet another object of the present invention is to provide an improved plug-in connector which will prevent unintentional unlocking of the plug-in connector These objects are achieved in the present invention by providing an improved plug-in connector with a receptacle and a plug in which the receptacle includes a groove which is at least partially open towards the insertion opening and a locking spring retained in the groove.

In contrast to the prior art plug-in connectors, the plug-in connectors in accordance with the present invention takes a completely new approach. Instead of providing a locking spring on the outside of the receptacle like the prior art, plug-in connectors in accordance with the present invention are provided with a locking spring retained inside of the receptacle. This inside arrangement of the locking spring ensures that it cannot be lost even during unlocking. In addition, the captive arrangement of the locking spring being retained in the groove in the receptacle ensures that the locking spring cannot be lost even when there is no plug in the insertion opening of the receptacle.

In one embodiment of the present invention, the plug-in connector includes a plug and a receptacle which can be connected together. The receptacle includes an insertion opening for receiving the plug, a groove at least partially open towards the insertion opening, and at least one locking spring retained in the groove for locking the plug and the receptacle together. The locking spring includes at least one locking section and one unlocking section actuable from outside of the receptacle for unlocking the plug and the receptacle. In this embodiment, only the unlocking section is a portion of the at least one locking spring which is accessible from outside of the receptacle. The receptacle may also include an unlocking opening accessible from outside of the receptacle and which discharges into the groove so that the unlocking section of the unlocking spring may extends from the groove into the unlocking opening. The locking spring is retained in the groove in a manner that the locking section is moved outward in a substantially radial direction into the groove when a force is applied to the unlocking section, thus disengaging the locking section from the plug and allowing separation of the plug and the receptacle.

In this embodiment of the present invention, the groove may be provided peripherally within the receptacle and the locking spring may be retained peripherally therein. The locking spring may be a twin-arm leaf spring having two arms, each arm including at least one locking section which is bent in a direction toward the other arm and each arm having a base which provides the unlocking section. The base of each arm may be joined together at a substantially 90° angle in the preferred embodiment. In addition, the locking spring may be held in the groove by at least one end of the locking spring which is positioned substantially diametrically opposed to the unlocking section. The two arms may also include a bent end which is bent at an angle between 40° and 80° relative to each of the two arms in an uninstalled state. These bent ends may then be inserted into at least one radial slot in the receptacle. In addition, the groove may also be shaped in a manner that the groove extends radially outward further in an area where the locking sections are to be positioned than in an area adjacent to the at least one radial slot. In this regard, the locking section may be circumferentially positioned at substantially 90° angle relative to the unlocking section.

In this embodiment of the present invention, the receptacle of the plug-in connector includes a base body and a closing part. The base body may include a portion of the groove and the closing part may also include another portion of the groove so that the groove is formed by the combination of the base body and the closing part. The plug-in connector may also include an anti-rotation element disposed between the plug and the receptacle. The anti-rotation element may include at least one projection provided on a surface of the plug and an axial groove provided in the receptacle for receivably engaging the projection. The receptacle may also be provided with a seal groove for receiving and retaining an O-ring.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

As previously noted, the plug-in connector in accordance with the present invention may be generally used for hose connections, i.e. for connecting the ends of two hoses. But the utility of the plug-in connector in accordance with the present invention is not limited to such an application. For instance, the plug-in connector in accordance with the present invention can also be used for pipe connections. In addition, the present invention may be practiced in other applications where either the receptacle or the plug is made stationary or provided on a stationary fixture and the complementary component (either a plug or a receptacle) is provided on an end of a hose or a pipe such that the hose or the pipe may be connected with the stationary receptacle or plug. In this regard, whereas the plug-in connector in accordance with the present invention is described in detail below as applied to a hose connection, it should be understood that the present invention is not limited thereto and may be practiced in various different applications.

Figure 1:
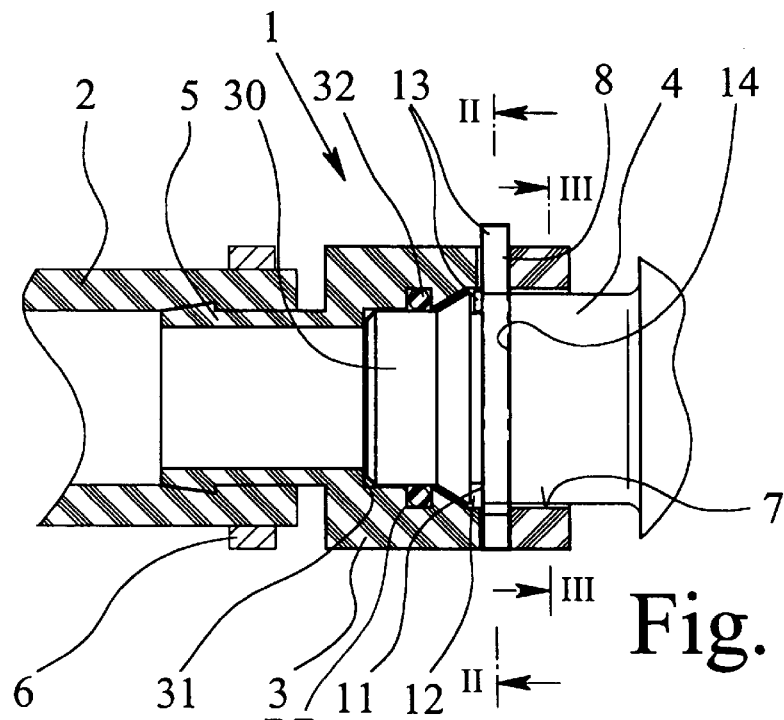
FIG. 1 shows a partial cutaway side view of one embodiment of a plug-in connector in accordance with the present invention, the plug being shown inserted into the receptacle.

FIG. 1 shows a plug-in connector 1 which as illustrated, may be used for connection of a hose 2 (of which only one end is shown) to another hose (not shown). Such plug-in connector 1 in accordance with the present invention may be used especially in motor vehicle applications, for example, in coolant systems and in heating systems. The plug-in connector 1 includes in its basic structure, a receptacle 3 and a plug 4. As can be seen, FIG. 1 shows a cutaway side view of the hose 2 and the receptacle 3 whereas the plug 4 is illustrated merely in a side view. In this embodiment, the receptacle 3 is provided with an entry fitting 5 and is joined via the entry fitting 5 to an end of the hose 2. Of course, the length of the hose 2 may vary depending on the application and only a small segment of the hose 2 is illustrated in FIG. 1 to clarify the use of the plug-in connector 1. To secure the hose end 2 to the entry fitting 5 of the receptacle 3, there may be provided a spring band steel clamp 6 as shown in the embodiment of FIG. 1. It should also be noted that the plug 4 may also be provided with an entry fitting (not shown) similar to the entry fitting 5 depending on its application. For instance, if the plug 4 is to be joined to another hose (not shown), such entry fitting (not shown) may be provided. In contrast, if the plug 4 is to be stationary or provided on a stationary fixture, such an entry fitting would not be required. It should also be recognized that this is equally applicable to the receptacle 3 such that the entry fitting 5 may or may not be provided on the receptacle depending on the application of the plug-in connector 1.

Figures 2A, 2B:
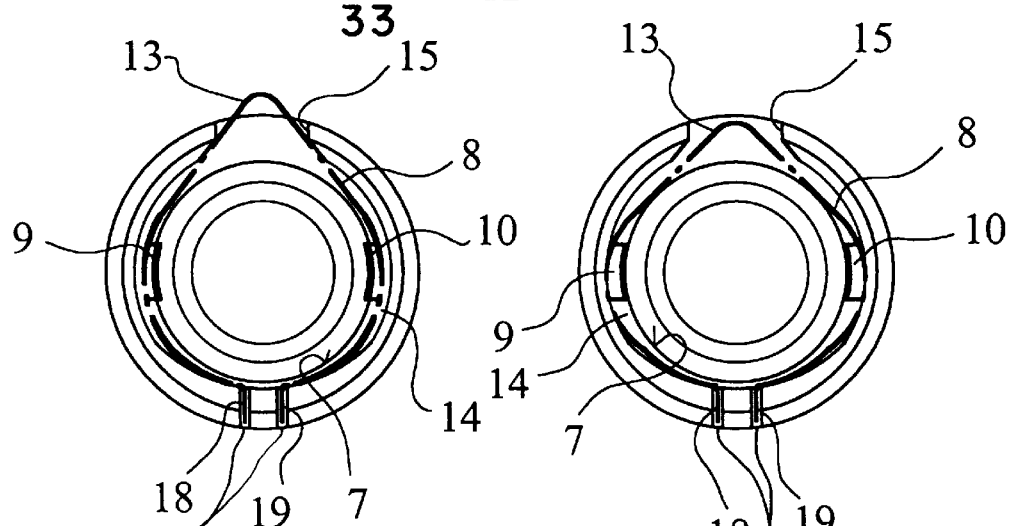
FIG. 2a shows a sectional view through the plug-in connector of FIG. 1 as viewed along the line II—II in a locked state.
FIG. 2b shows a section through the plug-in connector of FIG. 1 as viewed along the line II—II in an unlocked state.

FIG. 1 also shows that the receptacle 3 is provided with an insertion opening 7 for receiving the plug 4 within the receptacle 3. In addition, the receptacle 3 also includes a locking spring 8 which is used to lock the receptacle 3 and the plug 4 together and hold them in place relative to each other. As shown in FIGS. 2a, 2b, 5, and 8–10, there are two locking sections 9, 10 on the locking spring 8 that fit behind a stop 11 provided on the plug 4 when the plug 4 is inserted into the receptacle 3. In the illustrated embodiment, the stop 11 is a peripheral groove 12 formed on the plug 4. Thus, when the plug 4 is inserted into the insertion opening 7 of the receptacle 3, the two locking sections 9, 10 fit behind the stop 11 in the peripheral groove 12 as shown in FIG. 2a thereby locking the receptacle 3 and the plug 4 together.

Furthermore, the locking spring 8, as is shown in FIGS. 2a, 2b, 5, 9 and 10, includes an unlocking section 13 which can be actuated from the outside of the receptacle 3 to release the plug 4 so that it may be separated from the receptacle 3. If the unlocking section 13 of the locking spring 8 is pressed down into the receptacle 3, the locking sections 9 and 10 of the locking spring 8 move radially outward as shown in FIG. 2b so that they no longer catch behind the stop 11 and no longer engage the peripheral groove 12 provided on the plug 4.

At this point, it is significant to note that in the plug-in connector 1 in accordance with the illustrated embodiment of the present invention as shown in FIGS. 2a, 2b, 5 and 7, the receptacle 3 includes a groove 14 which is open towards the insertion opening 7. The locking spring 8 is provided in the groove 14 such that it is retained in the groove 14. The groove 14 is made such that only the unlocking section 13 of the locking spring 8 is accessible from the outside of the receptacle 3. In addition, the groove 14 may also be made such that the unlocking section 13 is only accessible from the outside of the receptacle 3 using a tool. In this regard, the receptacle 3 is provided with an unlocking opening 15 which is accessible from the outside of the receptacle 3 and which opens into the groove 14. The unlocking section 13 of the locking spring 8 extends from the groove 14 to the outside into the unlocking opening 15 as clearly shown in these figures. Thus, in contrast to the prior art plug-in connectors, the locking spring 8 is made in a manner and retained in the groove 14 of the receptacle 3 such that pressing down the unlocking section 13 of the locking spring 8 causes the unlocking of the receptacle 3 since such motion of the unlocking section 13 radially inward causes the locking sections 9, 10 of the locking spring 8 to moving radially outward no longer catch behind the stop 11 and no longer engage the peripheral groove 12 provided on the plug 4.

As also shown clearly in FIGS. 2a, 2b, 5 and 10, in the plug-in connector 1 in accordance with the illustrated embodiment, the groove 14 in the receptacle 3 and the locking spring 8 are made peripheral or essentially peripheral and the locking spring 8 is accordingly located in the groove 14.

Figure 8:
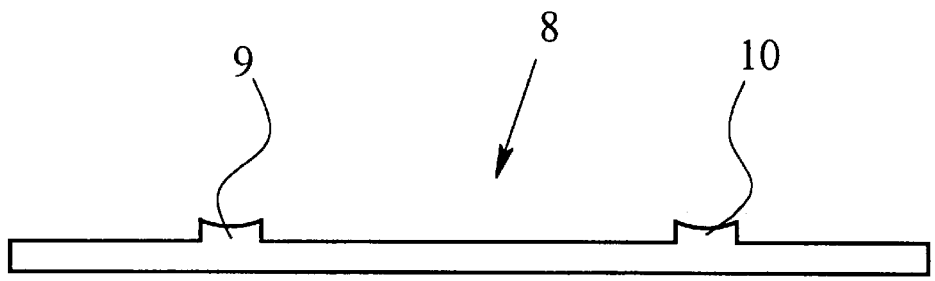
FIG. 8 is a plan view of a preferred embodiment of a locking spring in an extended state, which may be used in the plug-in connector of the present invention.
Figure 9:
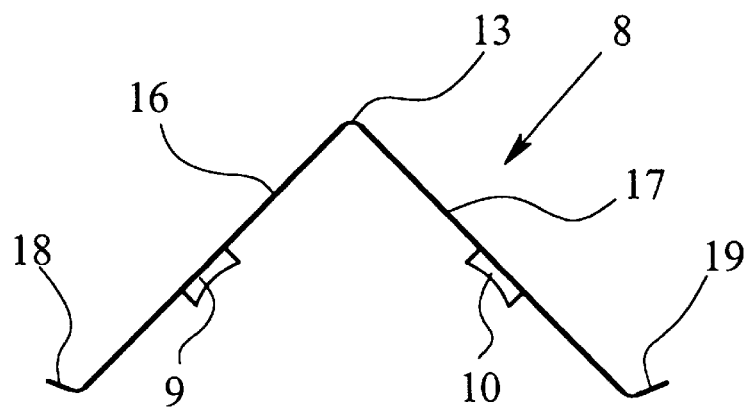
FIG. 9 shows a side elevational view of the locking spring of FIG. 8 in an unloaded state with locking sections already bent to function.
Figure 10:
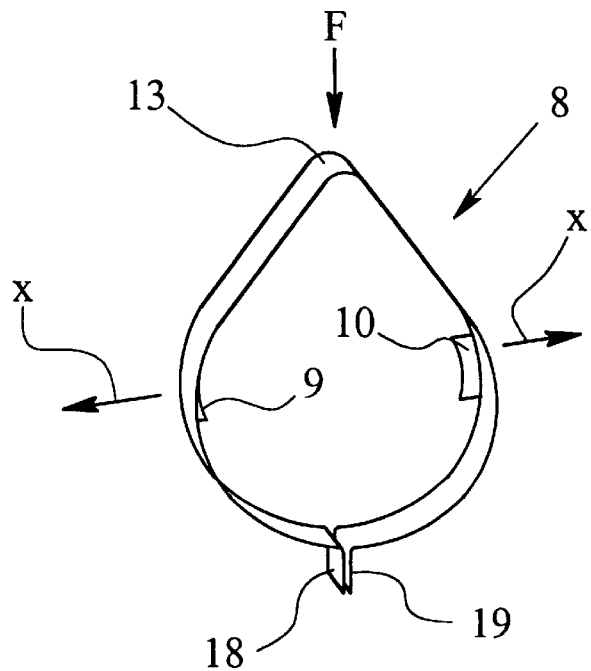
FIG. 10 shows a perspective view of the locking spring of FIG. 9 in an installation state.
Figure 11:
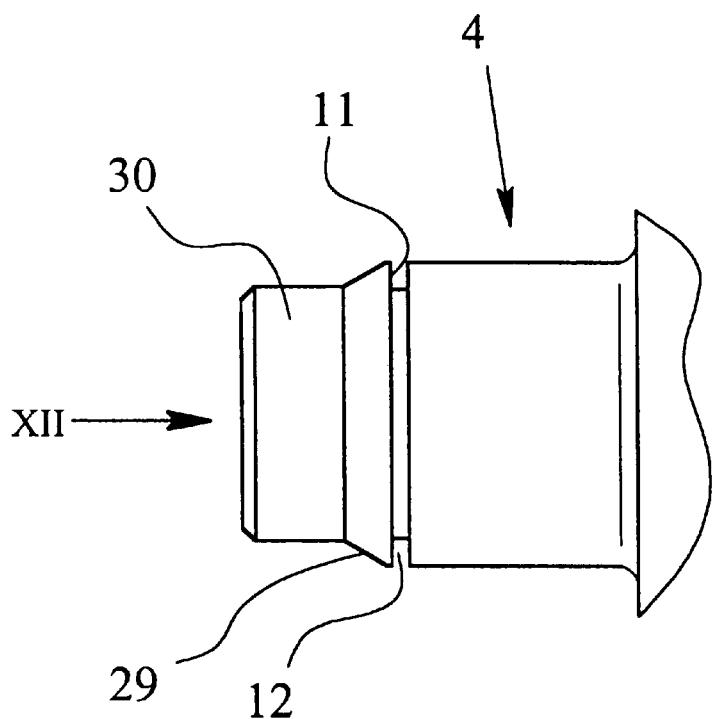
FIG. 11 shows a side view of part of a plug for use in the plug-in connector in accordance with one embodiment of the present invention.

Details of the locking spring 8 implemented in this embodiment are shown more clearly by FIGS. 8, 9, and 10. As shown in FIG. 8, the locking spring 8 is made in the manner of a leaf spring with two locking sections 9, 10. FIG. 9 shows the locking spring of FIG. 8 yielding a twin-arm leaf spring, the arm 16 being provided with the locking section 9 and the arm 17 being provided with the locking section 10. The locking sections 9, 10 are made in the shape of an arc on their sides facing one another, the radius of the arcs corresponding roughly to the radius of the insertion opening 7 of the receptacle 3. Comparison of FIGS. 8 and 9 shows that the locking sections 9, 10 are bent away from the arms 16 so that the locking sections 9, 10 will point radially inward within the receptacle 3. In addition, the locking spring 8 is bent itself such that the two arms 16, 17 of the locking spring 8 are at an angle of roughly 90° to one another when the locking spring 8 is not installed in the receptacle. The base of these arms 16, 17 (i.e. the bend in the locking spring 8) forms the unlocking section 13 of the locking spring 8.

Figures 5, 7:
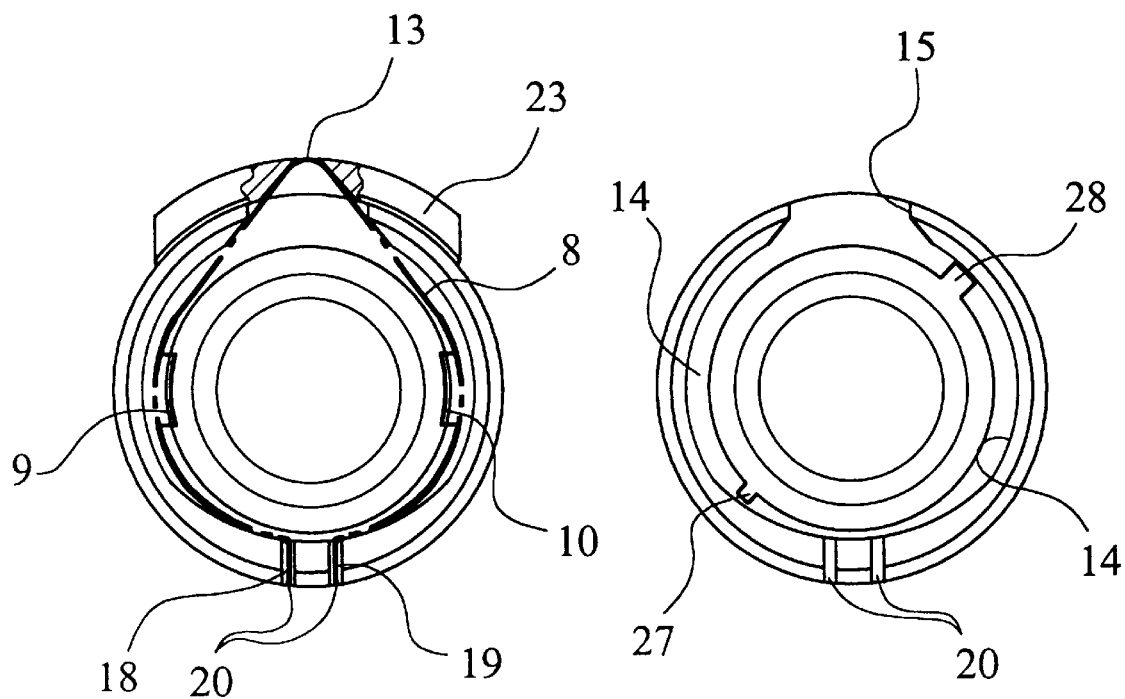
FIG. 5 shows the receptacle of FIG. 4 as viewed along line V—V in the direction of the arrows.
FIG. 7 shows the part of the receptacle shown in FIG. 6 as viewed in the direction of the arrow VII.

As FIGS. 2a, 2b and 5 show, the locking spring 8 is held in the groove 14 of the receptacle 3 on its area opposite the unlocking section 13. In particular, this is attained by providing bent ends 18, 19 on each arm 16, 17 of the locking spring 8 and inserting these bent ends 18, 19 into radial slots 20 in the receptacle 3. In this regard, the bent ends may be bent at an angle of roughly between 40° to 80°.

As follows from FIGS. 2a, 2b, 5 and 7, in the illustrated embodiment of a plug-in connector 1 in accordance the present invention, the portion of the groove 14 in the area of the locking sections 9, 10 of the locking spring 8 is lower than where the locking spring 8 is held. In other words, the groove 14 is shaped such that it extends radially outward further in the area where the locking sections 9, 10 are to be positioned than in the area adjacent to the slot 20. Thus, the depth of the groove 14 is properly designed such that in the unlocked state as shown in FIG. 2a, the locking spring 8 and the locking sections 9, 10 do not project into the insertion opening 7 but in the locked state as shown in FIG. 2b, the locking sections 9, 10 of the locking spring 8 do project into the insertion opening 7 or into the peripheral groove 12 of the plug 4.

Figures 4, 6:
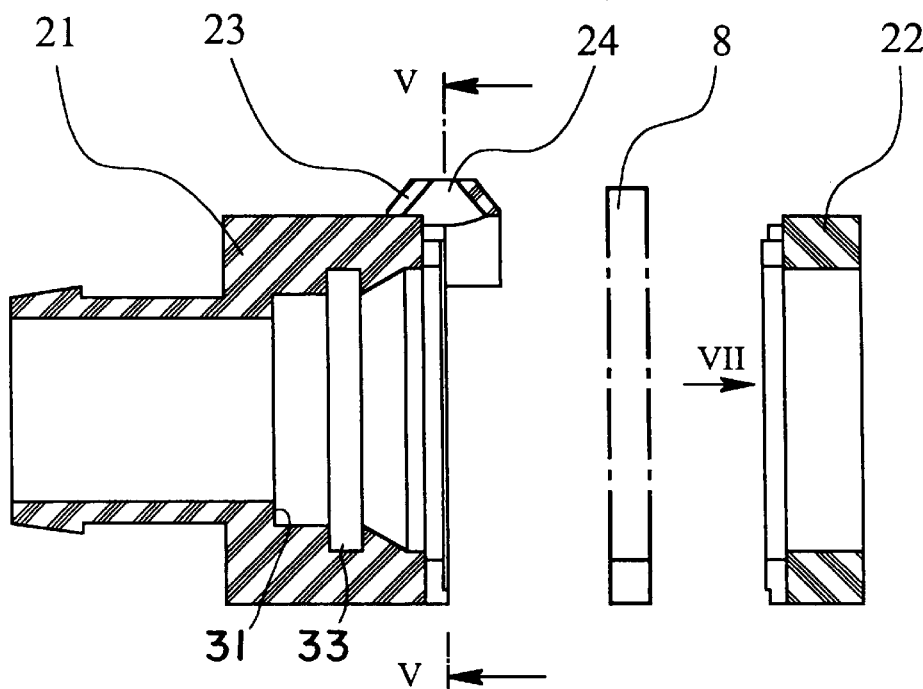
FIG. 4 shows a longitudinal sectional view of a base body of the receptacle in accordance with one embodiment of the present invention.
FIG. 6 shows a longitudinal sectional view through a closing part of a receptacle in accordance with one embodiment of the present invention.

One embodiment of the plug-in connector 1 in accordance with the present invention is shown in FIGS. 4 and 6 which clearly show a receptacle 3 made in two parts. More specifically, the receptacle may include a base body 21 and a closing part 22. Here, both the groove 14 and also the slot 20 are made partially in the base body 21 and partially in the closing part 22. Consequently, the locking spring 8 can be inserted either into the base body 21 or into the closing part 22 during the assembly of these components. After insertion of the locking spring 8, the base body 21 and closing part 22 may then be securely joined to one another, for example, by using a screw connection. In an alternative embodiment of the present invention, the receptacle 3 may be made in one piece with the locking spring 8 being inserted into the groove 14 either from the inside or the outside of the receptacle 3 via the insertion opening 7.

Figure 3:
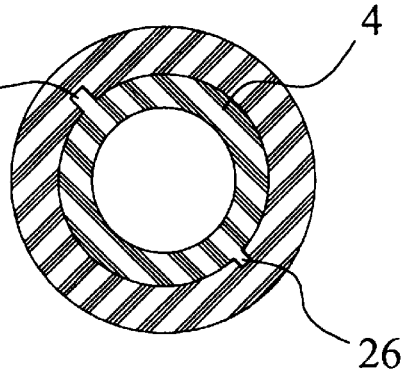
FIG. 3 shows a cross-section of the plug-in connector of FIG. 1 as viewed along line III—III.

In contrast to the embodiment shown in FIGS. 1 to 3, in the alternative embodiment shown in FIGS. 4 and 5, there is also provided an overlap 23 on the receptacle 3 above the unlocking opening 15. The overlap 23 has a through opening 24 which passes into the unlocking opening 15. The size of the through opening 24 is selected such that the unlocking section 13 of the locking spring 8 does not project to the outside from the through opening 24 even in the locked state which is shown in FIG. 5. As can be seen, this is different than in the previous embodiment of the present invention shown in FIGS. 1 and 2a where the unlocking section 13 of the locking spring 8 projects over the outside of the receptacle 3 in the locked state.

Figure 12:
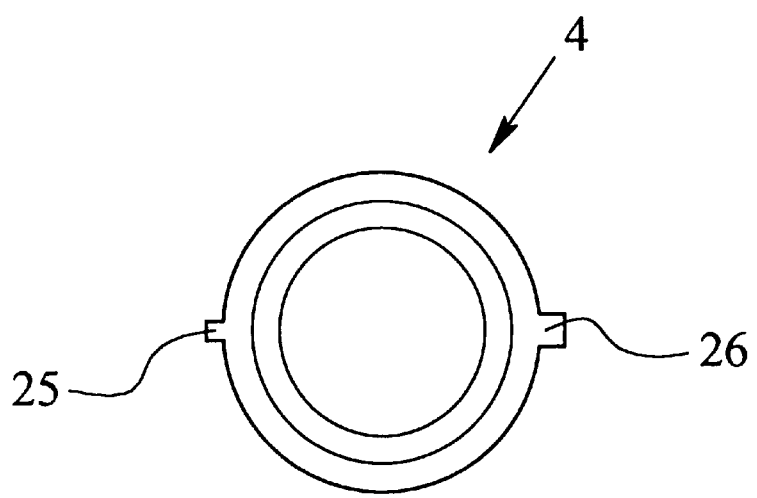
FIG. 12 shows the plug of FIG. 11 as viewed in the direction of the arrow XII.

Furthermore, in the embodiment shown in FIG. 12, the plug-in connector 1 in accordance with the present invention may optionally be provided with an anti-rotation element between the receptacle 3 and the plug 4. In this embodiment, the anti-rotation element may comprise two projections 25, 26 of unequal size on the plug 4 and the corresponding axial grooves 27, 28 in the receptacle 3 which are aligned in direction of the insertion of the plug 4. In the illustrated embodiment of FIG. 7, the axial grooves 27, 28 are located both in the base body 21 and also in the closing part 22. However, it is also within the scope of this embodiment to implement the axial grooves 27, 28 only in the base body 21 or only in the closing part 22. Again, it should be noted that the anti-rotation element and the axial grooves may be optionally provided on a plug-in connector in accordance with the present invention.

In operation, the coupling of the plug-in connector 1 is attained by first inserting the plug 4 into the insertion opening 7 of the receptacle 3 until a contact bevel 29, which is provided on the front end of the plug 4, comes into contact with the locking sections 9, 10 of the locking spring 8 that project into the insertion opening 7. As the plug 4 continues to be inserted into the receptacle 3, the locking sections 9, 10 of the locking spring 8 are pressed into the groove 14 of the receptacle 3 in the manner shown in FIG. 2b is attained. Since the peripheral groove 12 adjoins the contact bevel 29 of the plug 4, the locking sections 9, 10 of the locking spring 8 project into the peripheral groove 12 as the plug 4 is inserted further into the insertion opening 7 of the receptacle 3. Thus, at this point, the receptacle 3 and the plug 4 are locked together in the manner shown in FIG. 1.

To unlock the locking spring 8 and separate the receptacle 3 from the plug 4, a force F shown in FIG. 10 is applied to the unlocking section 13 of the locking spring 8. This causes the locking sections 9, 10 of the locking spring 8 to be displaced radially in the directions of the arrows X as shown in FIG. 10 until the unlocked state as shown in FIG. 2b is attained. Thus, in this unlocked state, the plug 4 can be withdrawn from the receptacle 3 to allow separation of these components. If the force F ceases to be exerted on the unlocking section 13 of the locking spring 8, the locking sections 9, 10 of the locking spring 8 spring back into the locking state shown in FIG. 2a.

It should also be pointed out that in the illustrated embodiment the plug-in connector 1 in accordance with the present invention, the plug 4 may be provided with a cylindrical section 30 in the forward area of the plug 4 which with its face meets a stop 31 on the end of the insertion opening 7 in the receptacle 3 as shown in FIGS. 1 and 4. The length of the plug 4 and the depth of the insertion opening 7 in the receptacle 3 which is bounded by the stop 31, are selected such that directly after the locking sections 9, 10 of the locking spring 8 fit into the peripheral groove 12 of the plug 4, the cylindrical section 30 of the plug 4 meets the stop 31 of the receptacle 3.

Finally, the illustrated embodiment of the plug-in connector 1 may also be provided with an O-ring 32 between the receptacle 3 and the plug 4 in the area of the cylindrical section 30 of the plug 4 so that a seal between the receptacle 3 and the plug 4 is attained. In this regard, the receptacle 3 may be provided with a corresponding seal groove 33 in the receptacle 3 for receiving and retaining the O-ring.

While various embodiments of the plug-in connector in accordance with the present invention have been shown and described, it is understood that the invention is not limited thereto. The present invention may be changed, modified and further applied by those skilled in the art. Therefore, this invention is not limited to the details shown and described previously but also includes all such changes and modifications which are encompassed by the appended claims.

We claim:

1. Plug-in connector comprising:

a plug; and a receptacle including an insertion opening for receiving said plug, a groove at least partially open towards said insertion opening, and at least one locking spring retained in said groove for locking said plug and said receptacle together, said locking spring including at least one locking section and one unlocking section actuable from outside of said receptacle for unlocking said plug and said receptacle, wherein said locking spring is a twin-arm leaf spring having two arms, each arm including at least one locking section which is bent in a direction toward the other arm and each arm having a base which provides said unlocking section.

2. Plug-in connector of claim 1, wherein only said unlocking section is a portion of said at least one locking spring which is accessible from outside of said receptacle.

3. Plug-in connector of claim 1, wherein said receptacle includes an unlocking opening accessible from outside of said receptacle.

4. Plug-in connector of claim 3, wherein said unlocking opening discharges into said groove and said unlocking section of said unlocking spring extends from said groove into said unlocking opening.

5. Plug-in connector of claim 1, wherein said locking spring is retained in said groove in a manner that said at least one locking section is moved outward in a substantially radial direction into said groove when a force is applied to said unlocking section thereby disengaging said locking section from said plug and allowing separation of said plug and said receptacle.

6. Plug-in connector of claim 1, wherein said groove is provided peripherally within said receptacle and said locking spring is retained peripherally therein.

7. Plug-in connector of claim 1, wherein said base of each of said two arms are joined at an angle of 70° to 110° with one another.

8. Plug-in connector of claim 7, wherein said base of each of said two arms are joined at a substantially 90° angle.

9. Plug-in connector of claim 1, wherein said locking spring is held in said groove by at least one end of said locking spring, said at least one end being positioned substantially diametrically opposed to said unlocking section.

10. Plug-in connector of claim 9, wherein said locking spring has two arms, and wherein each of said two arms include a bent end which is bent at an angle between 40° and 80° relative to each of said two arms in an uninstalled state and said bent end of each of said two arms are inserted into at least one radial slot in said receptacle.

11. Plug-in connector of claim 10, wherein said groove is shaped in a manner that said groove extends radially outward further in an area where said locking sections are to be positioned than in an area adjacent to said at least one radial slot.

12. Plug-in connector of claim 1, wherein said at least one locking section is circumferentially positioned at substantially 90° angle relative to said unlocking section.

13. Plug-in connector of claim 1, wherein said receptacle includes a base body and a closing part.

14. Plug-in connector of claim 13, wherein said base body includes a portion of said groove and said closing part includes another portion of said groove.

15. Plug-in connector of claim 1, further comprising an anti-rotation element disposed between said plug and said receptacle.

16. Plug-in connector of claim 15, wherein said anti-rotation element comprises at least one projection provided on a surface of said plug and an axial groove provided in said receptacle for receivably engaging said at least one projection.

17. Plug-in connector of claim 1, wherein said receptacle includes a seal groove for receiving and retaining an O-ring.

* * * * *